United States Patent [19]

Olsson et al.

[11] Patent Number: 5,061,142

[45] Date of Patent: Oct. 29, 1991

[54] DEVICE FOR LOADING AND UNLOADING VEHICLES AND AIRCRAFT

[76] Inventors: Bo Olsson; Claes Olsson, both of Sjöstorp 10, S-240 10 Dalby, Sweden

[21] Appl. No.: 505,423

[22] Filed: Apr. 6, 1990

[30] Foreign Application Priority Data

Apr. 7, 1989 [SE] Sweden .............................. 8901255

[51] Int. Cl.$^5$ ................................................ B64C 1/20
[52] U.S. Cl. ............................. 244/137.1; 414/142.3;
414/528; 414/523; 198/866; 198/832.3;
198/811
[58] Field of Search ............... 244/118.1, 137.1, 137.3;
414/527, 528, 523, 524, 139.1, 140.2, 140.8,
142.11–142.4, 507, 521, 525.1; 198/809, 811,
721, 750, 866, 832.3, 826, 827

[56] References Cited

U.S. PATENT DOCUMENTS

| 3,033,352 | 5/1962 | Kain | 198/826 |
| 3,089,580 | 5/1965 | Dilgard | 198/826 |
| 3,593,864 | 7/1971 | Moser | 414/528 |
| 3,734,270 | 5/1973 | Foudy | 198/811 |
| 3,734,271 | 5/1973 | Dolgolenko | 198/811 |
| 4,819,782 | 4/1989 | Fenner | 198/809 |

FOREIGN PATENT DOCUMENTS

| 0223584 | 5/1987 | European Pat. Off. |  |
| 1491774 | 7/1989 | U.S.S.R. | 198/811 |

OTHER PUBLICATIONS

WO 87/03857, Device for Moving Goods in the Cargo Spaces of Aircraft, Pub. Jul. 2, 1987, Nordstram.

Primary Examiner—Galen Barefoot
Attorney, Agent, or Firm—Pollock, Vande Sande & Priddy

[57] ABSTRACT

The present invention relates to an assembly for loading or unloading cargo which comprises a cargo space having a base portion and a loading-unloading apparatus having a supporting structure. A cargo conveyor has an upper part and a lower part, the upper part of the conveyor bearing against the supporting structure of the loading-unloading apparatus. Lifting devices are connected to the supporting structure for lifting the supporting structure to alter the distance between the supporting structure and the base portion. The raising of the supporting structure with respect to the base portion, when cargo is moved on the loading-unloading apparatus, transmits a substantially concentrated weight exerted by the cargo through the lifting devices to the base portion, and the lower part of the conveying means is freely movable beneath the supporting structure. The lowering of the supporting structure into direct abutment with the base portion through the lower part when the loading apparatus is inoperative in moving cargo, transmits the weight, exerted by the cargo to the base portion of the cargo space through the lower part of the conveyor, such that the weight is more evenly spread over the base portion.

14 Claims, 2 Drawing Sheets

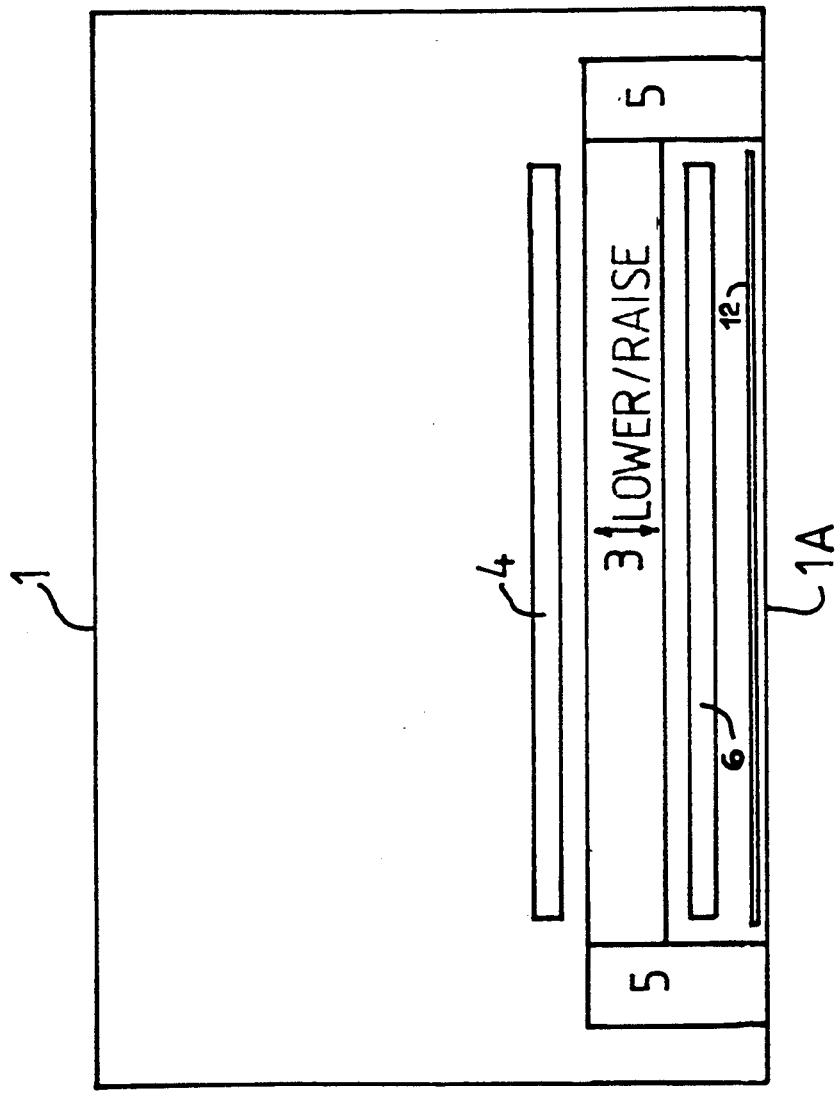

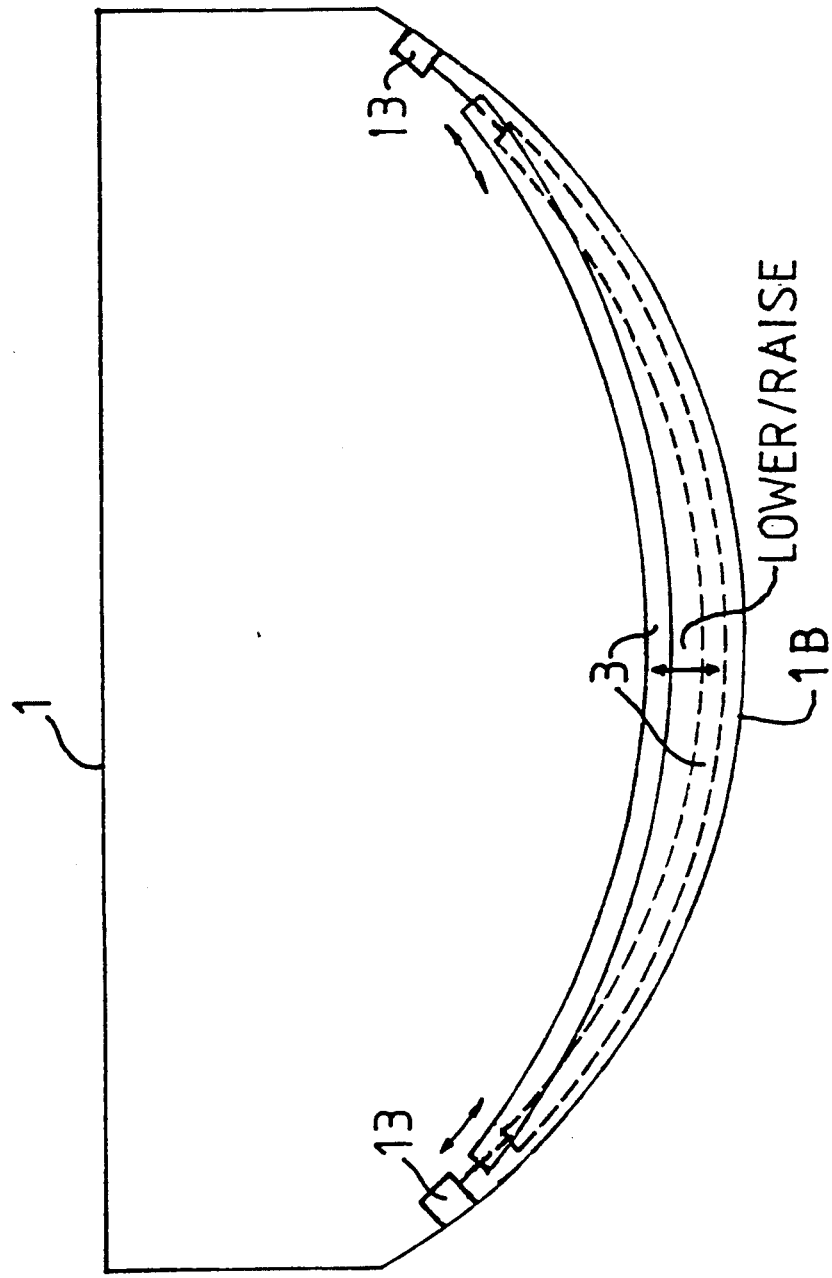

DEVICE FOR LOADING AND UNLOADING VEHICLES AND AIRCRAFT

FIELD OF THE INVENTION

The present invention relates to an assembly for loading and unloading cargo spaces or cargo bays, particularly the cargo spaces or bays of transportation vehicles and more particularly the cargo spaces or bays of average size aircraft.

SUMMARY OF THE INVENTION

The goods conveyor means incorporated in the present invention assembly are configured as to enable the forces exerted by the load and acting on the cargo space to be alternated between concentrated loads when loading/unloading and wide-spread loads, primarily when moving goods in the cargo space. The inventive device has low intrinsic weight, reliable function, very low power-consumption and is easy to handle. These qualities have long been desired, especially when handling goods in a passenger aircraft, without having been fully achieved by present day techniques. The present invention satisfies these requirements to a very high degree and in a manner totally different from presently known techniques.

The present invention is described in more detail below with reference to the accompanying schematic drawings, which are solely intended as non-limiting examples of the invention, and in which mutually corresponding components are identified by similar reference signs.

BRIEF DESCRIPTION OF THE DRAWINGS

In the drawings,

FIG. 1 illustrates a sectional view of a first preferred embodiment of the invention, taken at right angles to the longitudinal axis of a cargo space or bay.

FIG. 2 illustrates a section view of a second preferred embodiment.

DETAILED DESCRIPTION OF THE PREFERRED EMBODIMENT(S)

The cargo space shown in FIG. 1 has a bottom 1A in which there is arranged a loading-unloading apparatus 2 having a load supporting structure 3, one or more goods conveying means having an upper part 4 and a lower part 6, first lifting devices 5 and/or one or more raisable and lowerable devices 12, which in the illustrated embodiment are placed beneath the bottom 1A.

In FIG. 2 a cargo space or bay 1 is shown having a fully-rounded or partially-rounded bottom 1B and having provided therein second lifting devices 13 for the load supporting structure 3 and, although not shown, goods conveyor means having an upper part 4 and a lower part 6, first lifting devices 5 and/or one or more raisable and lowerable devices 12, also not shown.

In the case of the first, preferred embodiment shown in FIG. 1, the supporting structure 3 constantly bears against the upper part 4 of the conveyor means. When the supporting structure 3 is raised with the aid of the first lifting devices 5, the weight exerted by the cargo goods (not shown) carried by the upper part 4 is transferred to the bottom 1A through the lifting devices 5. In this case, the bottom 1A is loaded in a punctiform (concentrated) fashion, while the lower part 6 of the conveyor means is able to move freely beneath the supporting structure 3. On the other hand, when the load supporting structure 3 is moved to a lowered position, with the aid of the first lifting devices 5, the weight of the load on the upper part 4 is transferred to the bottom 1A through the entire supporting structure 3 and the lower part 6. Thus, in this case, the load is spread widely over the bottom 1A, which with respect to both the bottom 1A and to the cargo space is much more favorable than the punctiform loading.

When the vehicle incorporating the cargo space 1 is in motion, the structure 3 and the lower part 6 of the conveyor means will preferably lie in abutment with the bottom 1A, whereas during the loading/unloading of the cargo space 1, the structure 3 is lifted to a raised position.

As shown in FIG. 1, spreading of the load over the bottom 1A can also be effected with the aid of one or more raisable and lowerable devices 12 mounted above, in, or beneath the bottom 1A.

Spreading of the load can also be achieved by using both the lifting devices 5 and the raisable and lowerable devices 12 together.

FIG. 2 illustrates another preferred embodiment of the invention particularly intended for cargo spaces equipped with a fully-rounded or partially-rounded bottom 1B. In this case, the supporting structure 3 is raised/lowered with the aid of second lifting devices 13 which may either extend continuously or punctilinearly along the sides of the loading apparatus 2, which are parallel with the loading/unloading direction. These second lifting devices 13 are operative to move the supporting structure 3 substantially concentrically with the fully-rounded or partially-rounded bottom 1B, so that the structure will lie against the bottom 1B or be freely-supporting in relation to the bottom, in the various instances described above with reference to the first preferred embodiment. As with the first embodiment, spreading of the load can also be effected with the second embodiment by means of the raisable and lowerable devices 12, which are either used as an alternative or as complementary to the lifting devices 13.

In the case of the first embodiment, when the supporting structure 3 occupies its raised positions, the forces or loads acting on the bottom of cargo space will consist of the normal forces directed punctilinearly towards the bottom 1A through the first lifting devices 5. In the case of the second embodiment, when the supporting structure 3 occupies its raised position, the forces consist of normal forces directed towards the bottom 1B through the second lifting devices 13 and also of the forces which act tangentially in these devices by means of which the second lifting devices are mounted in the cargo space 1.

The conveyor means 4, 6 may have several different forms. Preferably, the conveyor means is in the form of a goods or cargo conveying belt or a plurality of conveying rollers. Thus, in the former case, the reference numeral 4 identifies the upper-run of a conveyor belt and the reference 6 its lower-run. In the latter case, the reference 4 identifies the upper part of conveyor roller paths and the reference numeral 6 the bottom part of the roller paths. The conveyor means 4, 6 may also consist of a combination of a conveyor belt and roller paths.

The invention is particularly intended for use in the cargo spaces or bays of average-size passenger aircraft. It will be understood, however, that the invention can be used in trucks, railroad carriages and ships, and also in stationary storage buildings without need to modify the described embodiments, or by making modifications that lie within the scope of the inventive concept.

We claim:

1. An assembly for loading or unloading cargo, comprising:
   a cargo space having a base portion;
   a loading-unloading apparatus having a supporting structure;
   cargo conveying means having an upper part and a lower part, the upper part of said conveying means bearing against said supporting structure of said loading-unloading apparatus; and
   lifting devices connected to said supporting structure for lifting said supporting structure to alter the distance between said supporting structure and said base portion, whereby raising of said supporting structure with respect to said base portion when cargo is moved on the loading-unloading apparatus, transmits a substantially concentrated weight exerted by the cargo through said lifting devices to said base portion, and said lower part of said conveying means is freely movable beneath said supporting structure, and whereby lowering of said supporting structure into indirect abutment with the base portion through said lower part when the loading apparatus is inoperative in moving cargo, transmits the weight, exerted by said cargo to said base portion of said cargo space through the lower part of said conveyor means, such that said weight is more evenly spread over said base portion.

2. An assembly for loading or unloading cargo according to claim 1, further comprising at least one raisable and lowerable device mounted adjacent said base portion which is also adapted for altering said distance between said supporting structure and said base portion.

3. An assembly for loading or unloading cargo according to claim 2, wherein said raisable and lowerable device is mounted in said base portion.

4. An assembly for loading or unloading cargo according to claim 1, wherein said conveying means is a conveyor belt having a cargo-carrying upper run and a lower return run.

5. An assembly for loading or unloading cargo according to claim 1, wherein said conveying means comprises a cargo-carrying roller means having an upper part and a lower part.

6. An assembly for loading or unloading cargo according to claim 1, wherein said conveying means is in the form of a combined cargo-conveyor belt and a plurality of cargo-carrying roller means.

7. An assembly for loading or unloading cargo, said assembly comprising:
   a cargo space having a base portion which is at least partially-rounded;
   a loading-unloading apparatus having a supporting structure;
   cargo conveying means having an upper part and a lower part, the upper part being adapted to bear against said supporting structure of said loading-unloading apparatus;
   lifting devices connected to said supporting structure for altering the distance between said supporting structure and said base portion, said lifting devices extending at least punctilinearly along the sides of the loading-unloading apparatus, said sides being parallel with the load-unloading direction;
   said lifting devices being adapted for lifting said supporting structure essentially concentrically with said base portion when cargo is moved onto said loading-unloading apparatus, such that the weight exerted by said cargo and the tangential forces acting adjacent said lifting devices are transferred concentrated to the base portion through said lifting devices and such that said lower-part of the conveyor means is freely movable beneath the supporting structure and for lowering said supporting means essentially concentrically with the base portion into indirect abutment with said base portion through said lower part when the loading-unloading apparatus is not in use, such that the weight exerted by said cargo is more evenly distributed over the area of the base portion and the tangential forces cease to exist.

8. An assembly for loading or unloading cargo according to claim 7, further comprising at least one releasable and lowerable device mounted adjacent said base portion also for altering said distance between said supporting structure and said base portion.

9. An assembly for loading or unloading cargo according to claim 7, wherein said conveying means is a conveyor belt having a cargo-carrying upper run and a lower return run.

10. An assembly for loading or unloading cargo according to claim 7, wherein said conveying means comprises a cargo-carrying roller means having an upper part and a lower part.

11. An assembly for loading or unloading cargo according to claim 7, wherein said conveying means is in the form of a combined cargo-conveyor belt and a plurality of cargo-carrying roller means.

12. An assembly for loading and unloading cargo, said assembly comprising:
   a cargo space having a base portion;
   a cargo conveyor system provided within said cargo space;
   support means for supporting said conveyor system above said base portion of said cargo space;
   means for transmitting weight exerted by said cargo from said conveyor system to said base portion; and
   means for effecting vertical movement of alter distance between said support means and said base portion for selectively changing the weight on said base portion from a concentrated weight to a more evenly spaced weight along said base portion.

13. An assembly for loading and unloading cargo according to claim 12, wherein said means for effecting vertical movement include at least one of the following:
   a) lifting means connected to said support means; and
   b) raisable and lowerable means adjacent said base portion.

14. An assembly for loading and unloading cargo according to claim 13, wherein said raisable and lowerable means is mounted in said base portion.

* * * * *